Aug. 10, 1943.  R. S. SANFORD  2,326,687
FLUID PRESSURE MECHANISM
Filed Dec. 11, 1941
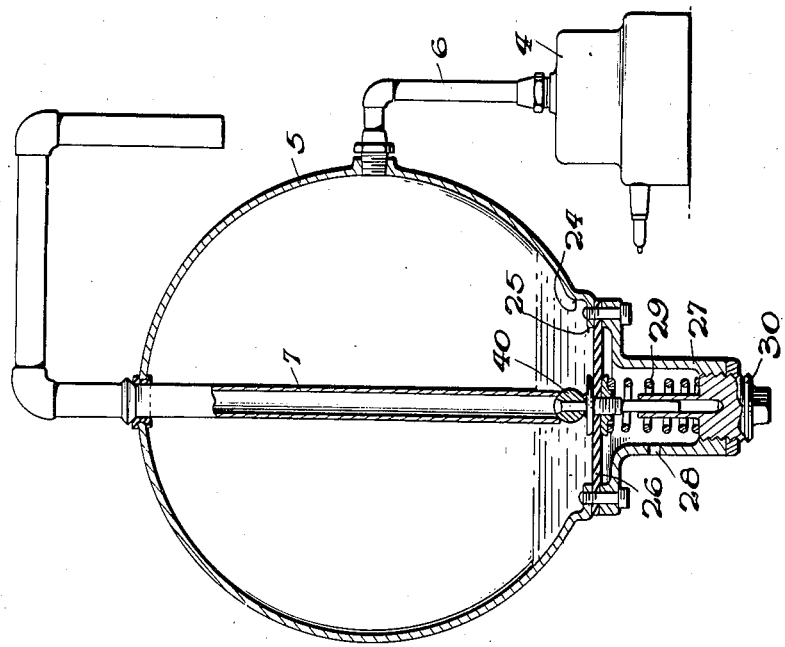
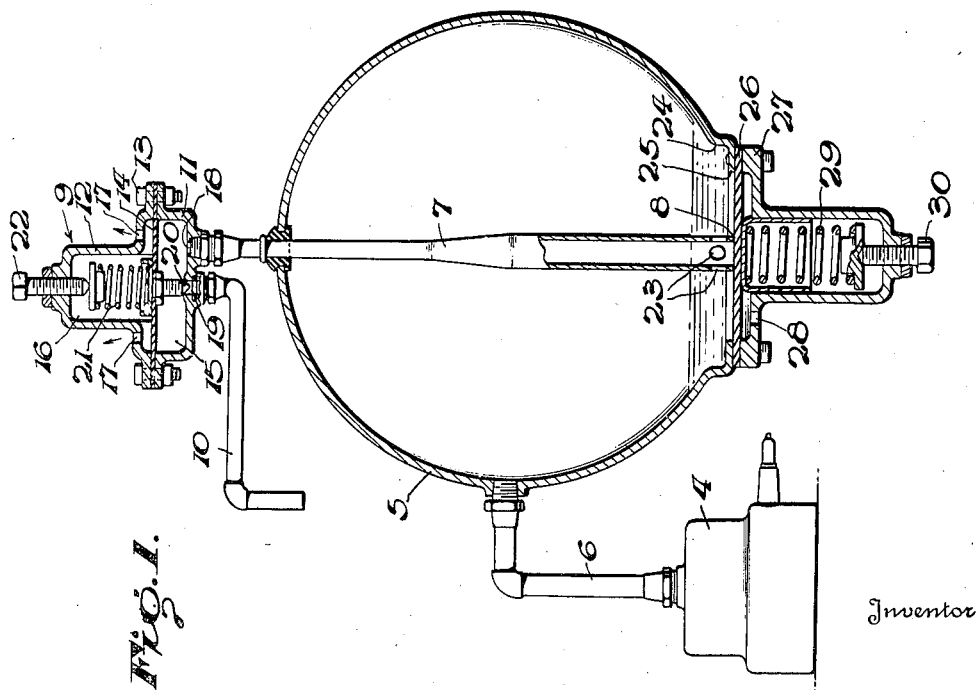
Inventor
Roy S Sanford.
By N. D. Parker Jr.  Attorney Patented Aug. 10, 1943

2,326,687

UNITED STATES PATENT OFFICE 2,326,687

FLUID PRESSURE MECHANISM

Roy S. Sanford, Middlebury, Conn., assignor to Bendix-Westinghouse Automotive Air Brake Company, Elyria, Ohio, a corporation of Delaware Application December 11, 1941, Serial No. 422,597

10 Claims. (Cl. 303—88)

This invention relates to fluid pressure systems and more particularily to mechanisms for exhausting fluid as well as liquid condensate from a fluid pressure system.

In the use of fluid pressure systems heretofore, it has been found, that during operation, a certain amount of liquid condensate is separated from the pressure fluid and usually finds its way to the lowest point in the system. In mild weather, the existence of such condensate offers no serious difficulty. However, in severe cold weather, such condensate is apt to freeze and thereby obstruct the proper flow of pressure fluid to effect the desired functions of the system, and is also liable to prevent the discharge of excess pressure from the reservoir with resultant possible damage to both the fluid compressor and the reservoir itself. It has, moreover, been observed that, in fluid pressure systems for operating various motor vehicle control devices such as brakes, clutches, etc., a certain amount of the entrained condensate may be carried through the system where it may freeze and prevent movement of essential control elements. Various devices have been resorted to heretofore, in an attempt to either prevent freezing of such condensate or to periodically drain the same from the system, thus preventing the detrimental effects which are otherwise experienced. However, these prior arrangements have possessed certain disadvantages including that of being inoperative in the event of actual freezing of the condensate in the reservoir.

One of the objects of the present invention is to provide a fluid pressure system constituted in such a manner as to avoid the above mentioned difficulties.

A further object is to provide a fluid pressure system arranged so as to automatically and periodically eliminate the condensate without any thought or intention on the part of the operator.

A still further object is to provide, in a system of the above character, a novel arrangement, wherein the separation of substantially all the liquid condensate is assured, and the tendency of carrying over such liquid into the operating parts of the system is decreased.

A further object is to provide a novel arrangement of the above type which will be relatively inexpensive and will require the addition of a few parts only to the existing system.

Yet a further object of the invention is to provide means for breaking formations of frozen liquid condensate which might otherwise interfere with the proper operation of a drain system of the above type.

A still further object of the invention is to provide means for automatically draining condensate from the reservoir which shall at the same time, act to destroy solid formations of frozen liquid condensate which might otherwise prevent the exhausting of excess fluid pressure from the reservoir.

Other objects and novel features of the invention will appear more fully hereinafter from a consideration of the following detailed description when taken in connection with the accompanying drawing illustrating two embodiments of the invention. It is to be expressly understood, however, that the drawing is utilized for purposes of illustration only and is not designed as a definition of the limits of the invention, reference being had for this latter purpose to the appended claims.

In the drawing, wherein similar reference characters refer to like parts throughout the several views:

Fig. 1 is a diagrammatic view partly in section, showing a fluid pressure system illustrative of one form of the present invention;

Fig. 2 is a diagrammatic view partly in section, illustrating another form of the invention.

Referring more particularly to the construction illustrated in Fig. 1, an arrangement embodying the principles of the present invention is disclosed therein as including a compressor 4, which may be driven by an internal combustion engine of an automotive vehicle, not shown, such compressor supplying fluid under pressure to a suitable reservoir 5, through a conduit 6. It is to be understood that the output of the reservoir may be utilized for controlling any fluid pressure-operated apparatus on the vehicle in a manner well known to those skilled in the art.

In fluid pressure systems of this type as applied to automotive vehicles, it is often customary to have the compressor supply fluid pressure to the reservoir at all times when the internal combustion engine is running, and it is accordingly necessary to provide means for automatically exhausting the excess fluid pressure pumped to the reservoir by the compressor. In the present instance such means includes a discharge conduit 7 having the lower end 8 thereof terminating near the bottom of the reservoir, and being provided at its outer end with a control valve mechanism 9 adapted to automatically establish a connection between the conduit 7 and atmosphere through an exhaust conduit 10, connected thereto in a manner to be hereinafter described.

The valve 9 includes a pair of hollow casing members 11 and 12, suitably clamped together by means of bolts 13, a pressure responsive member or diaphragm 14 being interposed therebetween, and serving in connection with the casing members to define a pressure chamber 15 and an atmospheric chamber 16, the latter chamber being connected with atmosphere at all times by means of ports 17 formed in the casing member 12. The casing member 11 is provided with a port 18 connected with the discharge conduit 7, and a port 19 connected with the exhaust conduit 10, the port 19 being normally closed by means of a valve 20 carried by the diaphragm 14 and urged to port-closing position by means of a spring 21 interposed between the diaphragm and a spring tension adjusting screw 22 threadedly carried by the upper casing member 12. It will be apparent from the foregoing description that the diaphragm 14 will be acted on at all times by the pressure in the conduit 7, and that when this pressure exceeds a predetermined value, the force exerted thereby on the diaphragm will be sufficient to overcome the tension of the spring 21, with the result that the valve 20 will be moved upwardly permitting communication to be established between the conduits 7 and 10, through port 18, chamber 15, and port 19.

The lower end 8 of the conduit 7 is open and in order to facilitate communication between the conduit 7 and the fluid within the reservoir 5, ports 23 may be provided in the wall of the conduit 7 adjacent the lower end thereof. The lower portion of the reservoir has a sump 24 formed therein and adapted to collect liquid condensate condensed in the reservoir, and the lower end of the tube 7 and the ports 23 are preferably so positioned as to be at all times below the normal level of the liquid condensate which may be collected in the sump.

While the system thus far described will operate satisfactorily to automatically remove excess fluid and condensate from the reservoir under normal weather conditions, it is readily apparent that the condensate may tend to freeze when lower temperatures are encountered, and means are accordingly provided for preventing formations of frozen condensate in the sump from clogging ports 23 and the end of the conduit, with resultant failure of the automatic fluid and condensate discharge system. To this end, the lower portion of the sump is provided with a relatively large port 25, this port being closed by means of a pressure responsive member or diaphragm 26 clamped between the lower surface of the sump and a casing member 27, the diaphragm thus at all times having its upper surface in contact with the condensate in the lower part of the sump, as well as being subjected to the pressure within the reservoir, and having its lower surface subjected at all times to atmospheric pressure by virtue of the atmospheric port 28 in the wall of the casing 27. In the present embodiment of the invention, the lower end of the conduit and the upper surface of the diaphragm are preferably so positioned as to cause the diaphragm to normally close the lower end of the conduit, and in order that the diaphragm may be maintained in this position, resilient means such as spring 29 is interposed between the lower face of the diaphragm and a spring adjusting screw 30 threadedly received by the lower portion of casing member 27.

It will be readily understood by those skilled in the art that during the normal operation of a fluid pressure system of the type heretofore described, certain fluctuations of pressure occur within the reservoir in response to variations in the demand for fluid pressure in the operation of the various devices connected to the reservoir, and the tension of the spring 29 is preferably so adjusted that a more or less continuous fluctuating movement of the diaphragm 26 will take place under this type of operation, it being further understood that the valve 9 is customarily adjusted to limit the maximum pressure which may obtain in the reservoir. Thus, in the present instance, the spring 29 will be so adjusted as to permit downward movement of the diaphragm 26 at a pressure somewhat less than that required to move the diaphragm 14 to open the valve 20 and permit discharge of fluid and condensate through the conduits 7 and 10. Such fluctuating movement of the diaphragm 26 will tend to prevent the formation of any solid block of frozen condensate around the end of the conduit 7 and in the event the ports 23 become clogged with ice, the consequent increased pressure in the reservoir 5 will move the diaphragm 26 downward sufficiently to break any ice formations and permit the discharge of excess fluid pressure from the reservoir through the open lower end 8 of the conduit 7, thus insuring against the presence of a dangerous or excessive pressure within the reservoir.

With particular reference to Fig. 2 of the drawing, it will be understood that the separate pressure control valve 9 may be dispensed with, allowing the pressure responsive member located in the bottom of the reservoir to directly control the opening and closing of the discharge conduit in order to perform the dual function of controlling the discharge of excess fluid pressure and condensate from the reservoir, as well as that of the breaking formations of frozen condensate about the end of the discharge conduit.

Here again, a compressor 4 serves to supply fluid pressure to a reservoir 5 through a conduit 6, the reservoir being provided with a discharge conduit 7 having one end terminating within the reservoir in the region of a condensate-collecting sump 24, provided therein. The sump 24 is provided with a large port 25 which is closed by means of a diaphragm 26 clamped between the lower surface of the sump portion of the reservoir and the casing member 27, the diaphragm thus being subjected at all times on its upper surface to the pressure in the reservoir as well as being in contact with any condensate collected therein, and the lower surface being subjected to atmospheric pressure through an atmospheric port 28 formed in the casing 27. A spherical valve 40 is clamped to the center of the diaphragm 26 as shown, and serves to open or close the lower end of the conduit 7 to permit the escape of condensate and fluid pressure therethrough. In order that the valve may be normally maintained in closed position, a spring 29 is interposed between the diaphragm and an adjusting screw 30 threadedly received in the lower portion of the casing 27, the tension of this spring being so adjusted that the fluid pressure acting on the diaphragm will be sufficient to overcome the tension of the spring and open the valve 40 whenever the desired pressure is reached in the reservoir.

Since the lower end of the conduit 7 is terminated at a point below the normal level of the liquid condensate collecting in the sump 24, opening of the valve will serve under the influence of the fluid pressure in the reservoir to permit such condensate to be forced out to atmosphere through the conduit 7, whenever the pressure in the reservoir is raised to a sufficient value to permit this to occur, through the operation of the compressor. It is to be noted, however, that the present construction is also effective in breaking up any formations of frozen condensate which may tend to occur around the valve 40 at the lower end of the conduit 7 when low temperatures are encountered, thus effectively preventing such formations from entirely blocking the escape of fluid pressure from the reservoir through the conduit 7 when the predetermined pressure for which the spring 27 is tensioned is obtained. Thus the mechanism described and illustrated in Fig. 2 of the drawing performs a dual function of regulating the pressure of fluid in the reservoir to a safe limit and at the same time preventing undesirable formations of frozen condensate in the lower portion of the reservoir or in the sump 24 which might tend to prevent such automatic regulations of pressure. It will be understood that under normal operation the compressor 4 is constantly supplying fluid under pressure to the reservoir 5, with the result that opening and closing movements of the valve 40 under the influence of the pressure acting on the diaphragm 26 are of sufficient frequency to prevent any large formations of frozen condensate from occurring in the sump, and the force exerted by the diaphragm under the influence of increasing pressures in the reservoir is amply sufficient to break-up any such formations.

There has therefore been provided by the present invention, a novel and efficiently operable fluid pressure system embodying relatively simple means for relieving the system of liquid condensate which, during severe cold weather, would freeze and adversely affect the various valves and other devices necessary for operating the vehicle controlling the fluid pressure operative devices, at the same time, novel means have been provided for preventing formations of frozen condensate in particles of sufficient size to clog the discharge system and prevent the relief of pressure from the reservoir necessary to maintain that pressure within safe limits.

While two embodiments of the invention have been disclosed and described herein, it will be understood that various changes in the component parts of the structures and rearrangement of the same may be resorted to without departing from the spirit of the invention, as well understood by those skilled in the art. Reference will, therefore, be had to the appended claims for a definition of the limits of the invention.

What is claimed is:

1. The combination with a reservoir for receiving fluid under pressure, of a conduit for exhausting condensate from said reservoir to atmosphere having one end thereof within said reservoir and terminating adjacent the bottom thereof, valvular means associated with said conduit and operable in response to variations in pressure in said reservoir for opening said conduit for permitting the exhaust of condensate therethrough, pressure responsive means positioned adjacent the end of said conduit in the bottom of the reservoir and movable for breaking frozen condensate and preventing clogging of said end of the conduit thereby, and resilient means for normally maintaining said valvular means and pressure responsive means in a predetermined position.

2. The combination with a reservoir for receiving fluid pressure, of a conduit having one end thereof within the reservoir and terminating adjacent the bottom thereof for exhausting condensate from the reservoir to atmosphere, means positioned adjacent the end of said conduit and movable in response to variations of fluid pressure in said reservoir for breaking formations of frozen condensate adjacent the end of said conduit, and yieldable means for normally maintaining said pressure responsive means in a predetermined position.

3. The combination with a reservoir for receiving fluid pressure having means for collecting condensate in the bottom portion thereof, of a conduit having one end thereof within said reservoir and terminating adjacent the bottom thereof and below the level of said condensate, and means positioned in the condensate receiving portion of said reservoir for normally closing the end of said conduit, said means being responsive to a predetermined increase in pressure in said reservoir to open the end of said conduit and to break formations of frozen condensate adjacent the end of said conduit.

4. The combination with a reservoir for receiving fluid pressure having a bottom portion for receiving liquid condensate, of a conduit for exhausting said condensate to atmosphere having one end thereof within said reservoir and terminating adjacent the bottom thereof and below the normal level of said condensate, means positioned in the bottom portion of said reservoir adjacent the end of said conduit and movable in response to variations of fluid pressure in said reservoir for breaking formations of frozen condensate adjacent the end of said conduit, and resilient means for normally maintaining the last named means in a predetermined position.

5. The combination with a reservoir for receiving fluid pressure having a bottom portion adapted to collect liquid condensate, of a conduit for exhausting condensate from said reservoir having one end thereof within said reservoir and terminating adjacent the bottom thereof below the normal level of said condensate, means positioned in the lower portion of said reservoir for normally closing the end of said conduit and movable in response to variations of fluid pressure in said reservoir for opening the end of said conduit, and resilient means for normally maintaining said conduit closing means in conduit closing position.

6. The combination with a reservoir for receiving fluid pressure having a bottom portion adapted to collect liquid condensate, of a conduit for exhausting condensate therefrom to atmosphere having one end thereof within said reservoir and terminating adjacent the bottom thereof, a pressure responsive member responsive to the pressure in said reservoir and positioned in the bottom thereof adjacent the end of said conduit, resilient means for normally maintaining said member in conduit closing position, and means for adjusting the tension of said resilient means whereby said member will open the end of said conduit when a predetermined pressure is reached in said reservoir.

7. The combination with a reservoir for receiving fluid pressure having a lower portion adapted to collect liquid condensate, of a conduit for exhausting condensate therefrom to atmosphere having an open end thereof within the reservoir and terminating adjacent the bottom of said condensate collecting portion, and means positioned in said latter portion and contacting said end for normally closing the end of said conduit and movable away from said end in response to an increase in pressure within said reservoir for opening the end of said conduit and for breaking formations of frozen condensate adjacent the end of said conduit.

8. The combination with a reservoir for receiving fluid pressure having a lower portion adapted to collect liquid condensate, of a conduit for exhausting condensate from said reservoir to atmosphere having one end thereof within said reservoir and terminating adjacent the bottom thereof below the normal level of said condensate, and means including a pressure responsive element positioned below the normal level of said condensate and in contact with said end for normally closing the end of said conduit and movable in response to a predetermined increase in reservoir pressure for opening said conduit and breaking frozen condensate adjacent the end of said conduit.

9. The combination with a fluid pressure system having a compressor and a reservoir for receiving fluid pressure therefrom having the lower portion adapted to collect liquid condensate, of means for preventing the accumulation of excessive pressure in the reservoir including a discharge conduit having one end thereof within the reservoir and terminating near the bottom thereof and below the normal level of said liquid condensate, and resiliently biased pressure responsive means positioned adjacent said condensate collecting portion for normally closing the end of said conduit and operable when the pressure in said reservoir exceeds a predetermined value for opening the end of said conduit and breaking formations of frozen condensate adjacent thereto for permitting the discharge of condensate through said conduit and for preventing the pressure in said reservoir from exceeding said predetermined value.

10. The combination with a reservoir for receiving fluid under pressure, of a conduit for exhausting condensate from said reservoir to atmosphere having one end thereof within said reservoir and terminating adjacent the bottom thereof, valvular means associated with said conduit and operable in response to a predetermined increase in pressure in said reservoir for opening said conduit for permitting the exhaust of condensate therethrough, and pressure responsive means normally positioned adjacent the end of said conduit in the bottom portion of said reservoir and movable in response to a predetermined increase in reservoir pressure less than the value of said first named predetermined pressure increase for breaking frozen condensate adjacent the end of said tube and insuring the free exhaust of fluid pressure through said conduit and valve on operation of the latter in response to said first named predetermined increase in reservoir pressure.

ROY S. SANFORD.